United States Patent
Lee et al.

(10) Patent No.: US 6,252,021 B1
(45) Date of Patent: Jun. 26, 2001

(54) PROCESS FOR PRODUCING POLYISOBUTENE USING A CATALYTIC SYSTEM COMPRISING TRANSITION METAL-BENZENE DERIVATIVE COMPOUND-METHYLALUMINOXANE

(75) Inventors: Kwanyoung Lee; Pil Sung Kim; IL Sang Maeng; Jong Mok Kim, all of Taejon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 09/447,866

(22) Filed: Nov. 23, 1999

(30) Foreign Application Priority Data

Nov. 23, 1998 (KR) .................................................. 98-50142
May 28, 1999 (KR) .................................................. 99-19421

(51) Int. Cl.$^7$ .......................... C08F 4/649; C08F 110/10
(52) U.S. Cl. ........................ 526/142; 526/141; 526/143; 526/188; 526/348.7
(58) Field of Search .................................... 526/141, 142, 526/143, 188, 348.7

(56) References Cited

U.S. PATENT DOCUMENTS

| | | | |
|---|---|---|---|
| 5,254,649 | * 10/1993 | Miln et al. | 526/348.7 X |
| 5,448,001 | 9/1995 | Baird | 526/134 |
| 5,668,232 | * 9/1997 | Langstein et al. | 526/348.7 X |
| 6,008,307 | * 12/1999 | Shaffer | 526/170 X |

OTHER PUBLICATIONS

Munmaya K. Mishra, C. Charles Chen, and Joseph P. Kennedy, Polymer Bulletin, "Living carbocationic polymerization," 1989, 455–492. No month.

Timothy D. Shaffer and John R. Ashbaugh, Journal of Polymer Science: Part A: Polymer Chemistry, vol. 35, "Noncoordinating Anions in Carbocationic Polymerization" 1997, 329–344. No month.

Bohumire Matyska, et al, Collection Czechoslov. Chem. Commun. [vol. 44] "Cationic Polymerization of Isoprene: Initiation by Complexes of Titanium Chloride with Halogenoacetic Acids," 1979, 1262–1272. No month.

Toshiyuki Hasebe, et al., Macromolecules 1996, 29, 6100–6103. No month.

* cited by examiner

Primary Examiner—Fred Teskin
(74) Attorney, Agent, or Firm—Davidson, Davidson & Kappel, LLC

(57) ABSTRACT

This invention relates to a process for polymerizing isobutene using a catalytic system comprising a transition metal compound, a benzene derivative compound, and methylaluminoxane, and the catalytic system applied to the polymerization of isobutene, (1) the added benzene derivative compound and methyl aluminoxane to the transition metal species provides higher stability of cation active site so that polyisobutene with a high molecular weight can be produced even at a higher reaction temperature than the conventional cationic polymerization temperature; (2) non-halogen solvent such as toluene can be employed as a polymerization solvent instead of halogenated solvents such as methyl chloride; and (3) under the stable catalytic system, a final product with a high yield can be ensured for its long-term use.

9 Claims, No Drawings

PROCESS FOR PRODUCING POLYISOBUTENE USING A CATALYTIC SYSTEM COMPRISING TRANSITION METAL-BENZENE DERIVATIVE COMPOUND-METHYLALUMINOXANE

BACKGROUND OF THE INVENTION

1. Field of the Invention

This invention relates to a process for producing polyisobutene with a high molecular weight at a higher temperature than the conventional polymerization temperature, using a catalytic system comprising a transition metal compound, a benzene derivative compound, and methylaluminoxane in non-halogenated solvent.

2. Background of the Related Art

Polyisobutene is generally produced by a cationic polymerization method at low temperature. Polyisobutene with a large molecular weight of more than 500,000 is reported to be produced at an extremely low temperature of lower than −80° C. due to the instability of carbocationic active species of polymerization at higher temperature, according to the literature released by Kennedy et al. [("Polymer", 6, 579 (1965)]. Catalyst used for producing polyisobutene has been selected from strong Lewis acids such as aluminum trichloride, boron trichloride and aluminum tribromide in halogenated solvent system comprising methyl chloride or dichloromethane.

However, such conventional polymerization method has some disadvantages in that (1) special facilities should be established due to the fact that polymerization is performed at an extremely low temperature, (2) heavy production costs are inevitably required for low temperature operation, and (3) chlorine-containing solvent used as a polymerization solvent causes the environmental problems.

In addition to the above mentioned method, another method of polymerizing isobutene using alcohol has been disclosed. Kennedy et al. have suggested a method for producing polyisobutene with molecular weight ranging from thousands to tens of thousands via a living polymerization using a variety of tertiary alcohols and boron trichloride as an initiator for polymerization ["Polymer Bulletin", 22, 455–462 (1989)]. Further, Toshiyuki et al. have disclosed a method of polymerizing isobutene using a catalytic system where some aromatic alcohol is combined to titanium tetrachloride ($TiCl_4$) ["Macromolecules", 29, 6,100–6, 103 (1996)].

Nevertheless, the process for producing polyisobutene in the presence of tertiary alcohol has encountered some problems in that excessive amount of tertiary alcohol should be added to monomer with a mole ratio of 1/100, since it is used as an initiator rather than an additive. Furthermore, boron trichloride which activate the initiator should be added in a high mole ratio of 1/10 to monomer. Another method for producing polyisobutene using aromatic alcohol has also faced disadvantages in its long-term storage and usage due to the instability of the catalytic system comprising transition metal-aromatic alcohol at room temperature.

Meantime, another method for producing polyisobutene using carboxylic acid has been disclosed. For example, M. Marek et al. have reported that isobutene has been very effectively polymerized at −20° C. using hydrofluoric acid as an initiator, together with a co-catalyst such as titanium tetrachloride, titanium tetrabromide, vanadium tetrachloride, and boron trichloride [Makromol. Chem., 174, 1, (1973)]. Further, B. Matyska et al. have suggested a method for polymerizing isoprene in the presence of a catalyst such as trifluoroacetic acid, trichloroacetic acid, titanium trichloride, with a variation in activity according to acidity of catalytic system. [Collect. Czech Chem. Commun., 44, 1262, (1979)].

In the recent years, intensive studies have focused on the method of producing polyisobutene in non-halogenated solvent. For example, a method for producing polyisobutene with ten of thousands of weight average molecular weight has been disclosed using non-coordinated anions such as tris(pentafluorophenyl)boron as a co-catalyst and toluene as a polymerization solvent at a polymerizaiton temperature of −20° C. (U.S. Pat. No. 5,448,001). Shaffer et al. have suggested that a polymer with a number average molecular weight of 140,000 can be obtained with 60% yield at −20° C. in the presence of tris(pentafluorophenyl)boron, ["Journal of Polymer Science: Part A: Polymer Chemistry", 35, 329–344 (1997)]. The above results suggest that a non-coordination anion generated from a Lewis acid with a large size provides an extra stability of carbocationic active site in the polymerization of isobutene. In this context, research efforts to incorporate a suitable non-coordinating anion has been continuously given to achieve higher reaction temperature in the polymerization of isobutene with high molecular weight.

SUMMARY OF THE INVENTION

Under such circumstances, the inventor et al. have made intensive studies to develop a process for high yield preparation of polyisobutene in non-halogenated solvent at higher polymerization temperature. The inventors have developed a catalytic system in a manner such that the mixture of benzene derivative compound (II) and a variety of transition metal compound (I) supported by methylaluminoxane(I). Methylaluminoxane is a polymeric aluminum compound which is generated from the reaction between alkylaluminium and a small amount of water and proved to be effective in activating the catalytic activity of metallocene in the polymerization various olefins. However, the effect of methylaluminoxane has yet to be established in the cationic polymerization, especially for the polymerization of isobutene.

Therefore, an object of this invention is to provide a process for producing polyisobutene with a large molecular weight at a higher reaction temperature than the conventional polymerization temperature in the absence of a halogenated solvent such as methyl chloride.

To achieve the above objective, the present invention is characterized by a process for producing polyisobutene using isobutene as a monomer and a catalytic system comprising a transition metal compound expressed by the following formula (I), a benzene derivative compound expressed by the following formula (II) and methylaluminoxane expressed by the following formula (III), in the presence of nonhalogen solvent:

$$MX_4 \quad\quad\quad (I)$$

where, M is titanium, vanadium or tin;

X is chlorine or bromine.

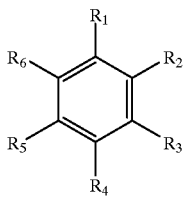
(II)

where, $R_1$ is hydroxy or carboxy group;

$R_2$, $R_3$, $R_4$, $R_5$ and $R_6$, which are the same or different groups, represent hydrogen, methyl group, methyl group, ethyl group, isopropyl group, isobutyl group, n-butyl group, t-butyl group, octyl group, alkoxy group, fluorine, chlorine, bromine, amino group, nitro group, hydroxy group or acetyl group.

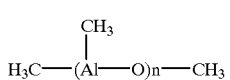
(III)

where, n is an integer of 3~40.

When the above catalytic system is applied to the manufacture of polyisobutene, there are several advantages in that (1) polymer with a large molecular weight can be induced due to the stabilization of cation active species in the growing polymer chain, (2) the loss of yield by unintentional termination can be minimized, and (3) the final polymer can be produced using a general organic solvent such as toluene instead of a halogenated solvent such as dichloromethane, at a higher temperature than the prior arts by about 30~50° C.

DETAILED DESCRIPTION OF THE INVENTION

This invention relates to a process for producing polyisobutene with a very high molecular weight at a higher temperature than the conventional polymerization temperature using a catalytic system comprising a transition metal compound, a benzene derivative compound, and methylaluminoxane. The polyisobutene of the invention can be produced by the following two stepwise preparation methods.

The first method to produce polyisobutene comprises the following processes of:

(1) a process of adding said transition metal compound(I) to the benzene derivative compound (II), followed by the addition of the catalytic system, so activated by the methylaluminoxane (III) for a certain period of time, to isobutene dissolved in a polymerization solvent for polymerization at the temperature of −70~−20° C. for 30~360 minutes;

(2) a process of infusing the previously cooled methanol solution into the resulting solution of the above (3) process at the temperature of −70~−30° C. and of terminating the reaction; and, (3) a process of washing the polymer, so precipitated, with methanol, followed by filtration and drying to obtain the final polymer.

The second method to produce polyisobutene comprises the following processes of:

(1) a process of adding said methylaluminoxane (III) to isobutene monomer dissolved in a non-halogened solvent;

(2) a process of adding transition metal compound (I) to the benzene derivative compound (II), followed by ageing the mixture at the temperature of −50~30° C. for 10~120 minutes to prepare a catalytic system;

(3) a polymerization process of infusing the activated catalytic system, so obtained from the above (2) process into said (1) process and of reacting the mixture at the temperature of−70~−20° C. for 30~360 minutes;

(4) a process of infusing the previously cooled methanol solution into the resulting solution of the above (3) process at the temperature of −70~−20° C. and of terminating the reaction; and, (5) a process of washing the polymer, so precipitated, with methanol, followed by filtration and drying to obtain the final polymer.

The purity of isobutene used for this invention as a starting material of polymerization is higher than 99% with less than 10 ppm of water content.

The catalyst used for this invention includes a variation of catalytic systems comprising a transition metal compound, benzene derivative compound, and methylaluminoxane. The detailed examples of the transition metal compound expressed by the formula (I) include titanium tetrachloride, vanadium tetrachloride and tin tetrachloride. Also, the detailed examples of the benzene derivative compound expressed by the formula (II) include 2,6-di-t-butyl-p-cresol, 2,4,6-tri-t-butyl-phenol, 2,6-diphenylphenol, 2,4-di-t-butyl-phenol, 2-t-butyl-4-methyl-phenol, benzoic acid and benzoic acid derivatives.

Hence, it is preferred that the transition metal compound (I) is added with a mole ratio of 1/1,000~1/5,000 to isobutene monomer; the benzene derivative compound (II) is added with a mole ratio of 1/500~1/10,000 to isobutene monomer; and, methylaluminoxane (III) is added with a mole ratio of 1/100~1/5,000 to isobutene monomer. More specifically, it is preferred that the transition metal compound(I) is added with a mole ration of 0.5~2 to the 15 benzene derivative compound (II), while methylaluminoxane (III), is added with a mole ratio of 1~10 to the transition metal compound (I).

The polymerization solvent of the present invention is one or more non-halogenated solvents selected from the group consisting of toluene, cyclohexane and hexane. It is preferred that 100~1,000 weight parts of the polymerization solvent is used to 100 weight parts of isobutene monomer. It is more preferred that 200~400 weight parts of the polymerization solvent is used to 100 weight parts of isobutene monomer.

It is preferred that the polymerization according to the present invention is performed at the temperature of −70 to −20° C. for 30 to 360 minutes. If the polymerization temperature deviates from the above range, the yield and molecular weight of the polymer product are reduced. Also, if the polymerization time deviates from the above range, the molecular weight distribution of polymer product increases due to the generation of polymer product with a low molecular weight.

The polymerization of isobutene is terminated in a manner such that a pre-cooled methanol solution is infused into the reaction solution to inactivates the catalyst. If the temperature of methanol is not maintained at a certain low temperature, the remaining catalyst may initiate an undesirable polymerization that results in polymer products with low molecular weight. The contamination of low molecular weight polymer may leads to a reduction in the physical properties of a final product. Therefore, the polymerization of isobutene should be terminated with methanol with low temperature.

According to the present invention, polyisobutene produced using a catalytic system comprising transition metal compound, benzene derivative compound, and methylaluminoxane, has its number average molecular weight in the range of 100,000~1,000,000 and the molecular weight distribution of 1.2~5.0, more preferably in the range of 1.5~3.0.

This invention is explained in more detail based on the following Examples but is not limited by these Examples.

EXAMPLE 1

All reagents for this experiment were purified and stored under a nitrogen atmosphere before use. The interior of 100 ml reactor was dried under reduced pressure for 2 hours and substituted sufficiently with argon gas. 5.64 g of isobutene (100 mmol), which was purified by passing through activated alumina column and 20 ml of freshly distilled toluene were added to the reactor and then the reactor was cooled to −20° C.

Separately, 0.099 g of BHT(2,6di-t-butyl-p-cresol; 0.45 mmol) was dried under reduced pressure. 10 ml of toluene and 0.055 ml of titanium (IV) chloride (0.6 mmol) were successively added to the dried BHT and reacted for 2 hours. Then 0.85 ml of methylaluminoxane (0.24 mmol) was added to the mixture and the resulted catalyst solution was cooled to −20° C. 1 ml of the catalyst solution was added to the reactor and reacted at −20° C. for 120 minutes. The polymerization was terminated by adding 1 ml of methanol. Precipitated polymeric product was separated from the solution, washed with methanol several times and dried.

EXAMPLES 2~3

Isobutene was polymerized- in the same manner as Example 1, except for the amounts of BHT used was varied to 0.132 g(0.60 mmol) and 0.165 g (0.75 mmol), respectively.

EXAMPLES 4~7

Isobutene was polymerized in the same manner as Example 1, except for using 0.118 g of 2,4,6-tri-t-butyl-phenol (0.45 mmol), 0.111 g of 2,6-di-phenyl-phenol (0.45 mmol), 0.093 g of 2,4-di-t-butyl-phenol (0.45 mmol) and 0.074 g of 2-t-butyl-4-methyl-phenol (0.45 mmol), respectively, instead of the BHT.

COMPARATIVE EXAMPLE 1

Isobutene was polymerized in the same manner as Example 1, except the use 0.055 ml of titanium(IV) chloride (0.6 mmol) without BHT and methylaluminoxane in the catalyst solution.

COMPARATIVE EXAMPLE 2

Isobutene was polymerized in the same manner as Example 1, except for using 0.055 ml of titanium (IV) chloride (0.6 mmol) and 0.85 ml of methylaluminoxane (0.24 mmol) in the catalyst solution without BHT.

The following table 1 showed the polymerization results [e.g., yield, number average molecular weight (Mn), weight average molecular weight (Mw) and distribution of molecular weight (Mw/Mn)], when isobutene was polymerized according to each Example and Comparative example.

TABLE 1

| | Yield (%) | Mn | Mw | Mw/Mn |
|---|---|---|---|---|
| Example | | | | |
| 1 | 95.3 | 142,000 | 336,000 | 2.36 |
| 2 | 97.0 | 128,000 | 379,000 | 2.96 |
| 3 | 97.7 | 105,000 | 447,000 | 4.26 |
| 4 | 95.8 | 96,000 | 319,000 | 3.32 |
| 5 | 93.0 | 108,000 | 347,000 | 3.21 |
| 6 | 93.2 | 126,000 | 377,000 | 2.99 |
| 7 | 93.1 | 130,000 | 400,000 | 3.10 |
| Comparative example | | | | |
| 1 | 95.6 | 33,000 | 106,000 | 2.36 |
| 2 | 94.5 | 71,000 | 156,000 | 2.20 |

From the above table 1, It is clearly shown that the combined catalytic system of titanium tetrachloride, methylaluminoxane, and phenol derivative has a superior activity than either titanium tetrachloride alone or the mixture of titanium tetrachloride and methyl aluminoxane and results in higher molecular weight polymer. Also the successive improvement of catalytic activity by the stepwise addition of methylaluminoxane and phenol derivative to titanium tetrachloride indicates that each component of the catalytic system of the present invention is essential to producing polyisobutene with high molecular weight.

EXAMPLE 8

All reagents were purified and stored under nitrogen atmosphere prior to use. The interior of 100 ml reactor was dried under reduced pressure for 2 hours and filled with argon gas. 5.64 g of isobutene (100 mmol), which was passed through activated alumina column and 20 ml of fresh distilled water were added to the reactor and then the reactor was cooled to −50° C. Separately, the solution of catalyst was prepared by the successive addition of 1 ml of toluene and 0.0055 ml of titanium (IV) chloride (0.6 mmol) to 0.01 g of 2,4,6-trimethylbenzoic acid (0.06 mmol) which was dried under reduced pressure. Then 0.85 ml of methylaluminoxane (0.24 mmol) was added to the mixture. The mixture was stirred for 20 minutes at room temperature and then, further stirred at −50° C. for 10 minutes. The catalyst solution was added to the reactor at −50° C. and stirred for 2 hours. The reaction was terminated by adding 1 ml of methanol. Precipitated polymeric product was separated from the solution, washed with methanol several times and dried.

EXAMPLE 9

Isobutene was polymerized in the same manner as Example 8, except that 0.0093 g of 2,6-dimethylbenzoic acid (0.06 mmol) was employed instead of 2,4,6-trimethylbenzoic acid.

EXAMPLE 10

Isobutene was polymerized in the same manner as Example 8, except that 0.0092 g of 2,4-dimethylbenzoic acid (0.06 mmol) was employed instead of 2,4,6-trimethylbenzoic acid.

EXAMPLE 11

Isobutene was polymerized in the same manner as Example 8, except that 3,5-dichlorobenzoic acid 0.0117 g(0.06 mmol) was employed instead of 2,4,6-trimethylbenzoic acid.

EXAMPLE 12

Isobutene was polymerized in the same manner as Example 8, except that 0.091 g of 4-ethylbenzoic acid (0.06 mmol) was employed instead of 2,4,6-trimethylbenzoic acid.

EXAMPLE 13

Isobutene was polymerized in the same manner as Example 8, except that 0.0107 g of 4t-butylbenzoic acid (0.06 mmol) was employed instead of 2,4,6-trimethylbenzoic acid.

EXAMPLE 14

Isobutene was polymerized in the same manner as Example 8, except that 0.0094 g of 3-chlorobenzoic acid (0.06 mmol) was employed instead of 2,4,6-trimethylbenzoic acid.

EXAMPLE 15

Isobutene was polymerized in the same manner as Example 8, except that 0.009 g of 3-dimethylbenzoic acid (0.06 mmol) was employed instead of 2,4,6-trimethylbenzoic acid.

EXAMPLE 16

Isobutene was polymerized in the same manner as Example 8, except that 0.009 g of 2,5-dimethylbenzoic acid (0.06 mmol) was employed instead of 2,4,6-trimethylbenzoic acid.

EXAMPLE 17

Isobutene was polymerized in the same manner as Example 8, except that 0.0087 g of 4-fluorobenzoic acid (0.06 mmol) was employed instead of 2,4,6-trimethylbenzoic acid.

EXAMPLE 18

Isobutene was polymerized in the same manner as Example 8, except that 0.0094 g of 4-chlorobenzoic acid (0.06 mmol) was employed instead of 2,4,6-trimethylbenzoic acid.

EXAMPLE 19

Isobutene was polymerized in the same manner as Example 8, except that 0.0122 g of 4-bromobenzoic acid (0.06 mmol) was employed instead of 2,4,6-trimethylbenzoic acid.

Example 20

Isobutene was polymerized in the same manner as Example 8, except that 0.0127 g of 2,4-dinitrobenzoic acid (0.06 mmol) was employed instead of 2,4,6-trimethylbenzoic acid.

EXAMPLE 21

Isobutene was polymerized in the same manner as Example 8, except that 0.0127 g of 3,5-dinitrobenzoic acid (0.06 mmol) was employed instead of 2,4,6-trimethylbenzoic acid.

EXAMPLE 22

Isobutene was polymerized in the same manner as Example 8, except that 0.0094 g of 2-chlorobenzoic acid (0.06 mmol) was employed instead of 2,4,6-trimethylbenzoic acid.

EXAMPLE 23

Isobutene was polymerized in the same manner as Example 8, except that 0.0093 g of 2,6dihydroxybenzoic acid (0.06 mmol) was employed instead of 2,4,6-trimethylbenzoic acid.

As for each of the final polymers obtained from Examples 8~23, its weight ratio of isobutene monomer was calculated and expressed by percentage (weight %) to determine the final yield. Further, the following parameters were determined using gel permeation chromatography(GPC) which was calibrated by polystyrene standard sample: weight average molecular weight(Mw), number average molecular weight(Mn), and distribution of molecular weight(Mw/Mn). The results are shown in the following table 2.

TABLE 2

| Example | Yield (%) | Mn | Mw | Mw/Mn |
|---|---|---|---|---|
| 8 | 50.6 | 435,000 | 813,000 | 1.87 |
| 9 | 86.1 | 234,000 | 491,000 | 2.10 |
| 10 | 71.4 | 217,000 | 509,000 | 2.35 |
| 11 | 95.3 | 348,000 | 726,000 | 2.09 |
| 12 | 66.8 | 117,000 | 406,000 | 3.47 |
| 13 | 73.6 | 146,000 | 451,000 | 3.09 |
| 14 | 97.1 | 156,000 | 496,000 | 3.18 |
| 15 | 79.9 | 27,000 | 296,000 | 11.09 |
| 16 | 84.6 | 22,000 | 257,000 | 11.47 |
| 17 | 89.4 | 78,000 | 378,000 | 4.84 |
| 18 | 85.6 | 49,000 | 273,000 | 5.58 |
| 19 | 86.0 | 80,000 | 320,000 | 3.99 |
| 20 | 55.3 | 281,000 | 760,000 | 2.71 |
| 21 | 75.3 | 195,000 | 506,000 | 2.59 |
| 22 | 71.5 | 67,000 | 306,000 | 4.54 |
| 23 | 81.8 | 24,000 | 211,000 | 8.71 |

COMPARATIVE EXAMPLES 3~4

Isobutene was polymerized in the same manner as Example 8, except for the added amount of titanium (IV) chloride as 0.011 ml (0.12 mmol) and 0.022 ml (0.24 mmol), respectively. The results are shown in the following table 3.

TABLE 3

| Comparative Example | TiCl4 (mmol) | Yield (%) | Mn | Mw | Mw/Mn |
|---|---|---|---|---|---|
| 3 | 0.12 | 94.1 | 221,000 | 711,000 | 3.21 |
| 4 | 0.24 | 96.8 | 191,000 | 554,000 | 2.91 |

EXAMPLES 24~26

Isobutene was polymerized in the same manner as Example 8, except for the variation of solvent/monomer ratio(S/M ratio, the weight rate of toluene/isobutene) to 1,6 and 9. The results are shown in the following table 4.

TABLE 4

| Example | S/M | Yield (%) | Mn | Mw | Mw/Mn |
|---|---|---|---|---|---|
| 24 | 1 | 78.9 | 222,000 | 610,000 | 2.75 |
| 8 | 3 | 50.6 | 435,000 | 813,000 | 1.87 |
| 25 | 6 | 88.3 | 174,000 | 478,000 | 2.74 |
| 26 | 9 | 76.4 | 353,000 | 774,000 | 2.19 |

COMPARATIVE EXAMPLE 5

Isobutene was polymerized in the same manner as Example 8, except for using 0.055 ml of titanium (IV) chloride (0.6 mmol) only as a catalyst.

COMPARATIVE EXAMPLE 6

Isobutene was polymerized in the same manner as Example 8, except for using 0.055 ml of titanium (IV) chloride (0.6 mmol) and 0.85 ml of methylaluminoxane (0.24 mmol) as a catalytic system. The results are shown in the following table 5.

TABLE 5

| Comparative example | Yield (%) | Mn | Mw | Mw/Mn |
|---|---|---|---|---|
| 5 | 82.4 | 37,000 | 207,000 | 5.64 |
| 6 | 61.5 | 83,000 | 403,000 | 4.88 |

The comparison of the results of Example 8 with Comparative examples 5 and 6 clearly shows that the catalytic system from titanium tetrachloride, methylaluminoxane, and benzoic acid derivative results in higher molecular weight and smaller molecular weight distribution value than either catalytic system from titanium tetrachloride alone or the mixture of titanium tetrachloride and methyl aluiminoxane. Also the successive improvement of catalytic activity by the stepwise addition of methylaluminoxane and benzoic acid derivative to titanium tetrachloride indicates that each component of the catalytic system of the present invention is essential to the preparation of polyisobutene with high molecular weight and narrow molecular weight distribution.

COMPARATIVE EXAMPLES 7~9

Isobutene was polymerized in the same manner as Comparative example 6, except for using methylaluminoxane as 043 ml(0.12 mmol), 1.28 ml(0.36 mmol ) and 1.7 ml(0.48 mmol), respectively. The results are shown in the following table 6.

TABLE 6

| Comparative example | MAO (mmol) | Yield (%) | Mn | Mw | Mw/Mn |
|---|---|---|---|---|---|
| 7 | 0.12 | 89.6 | 47,000 | 402,000 | 8.57 |
| 6 | 0.24 | 61.5 | 83,000 | 403,000 | 4.88 |
| 8 | 0.36 | 40.0 | 85,000 | 588,000 | 6.94 |
| 9 | 0.48 | 5.4 | 123,000 | 583,000 | 4.74 |

As described above, the present invention relates to the process for producing polyisobutene using isobutene as a monomer and a catalytic system comprising transition metal compound expressed by the formula (I), benzene derivative compound expressed by the formula (II), methylaluminoxane expressed by the formula (III), via cationic polymerization. According to the invention, it has several advantages in that (1) the molecular weight of the resulted polyisobutene is higher than that of the prior arts using a transition metal compound as a catalytic system, with high yield, (2) polyisobutene with high molecular weight can be prepared at a higher temperature by 30~50° C., (3) a general organic solvent such as toluene can be employed instead of halogenated solvent such as methyl chloride.

What is claimed is:

1. A process for producing polyisobutene using isobutene as a monomer and a catalytic system comprising a transition metal compound expressed by the following formula (I), a benzene derivative compound expressed by the following formula (II) and methylaluminoxane expressed by the following formula (III), in the presence of non-halogenated solvent:

$$MX_4 \quad (I)$$

where, M is titanium, vanadium or tin;
X is chlorine or bromine

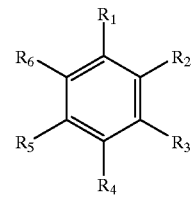

(II)

where, $R_1$ is hydroxy or carboxy group;
$R_2$, $R_3$, $R_4$, $R_5$ and $R_6$, which are the same or different groups, represent hydrogen, methyl group, ethyl group, isopropyl group, isobutyl group, n-butyl group, t-butyl group, octyl group, alkoxy group, fluorine, chlorine, bromine, amino group, nitro group, hydroxy group or acetyl group

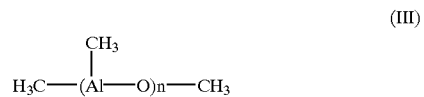

(III)

where, n is an integer of 3 to 40.

2. The process for producing polyisobutene according to claim 1, wherein it comprises:
   (1) a process of adding said methylaluminoxane (III) to isobutene monomer dissolved in a non-halogenated polymerization solvent;
   (2) a process of adding said transition metal compound (I) to the benzene derivative compound (II), followed by ageing the mixture at the temperature of −50 to 30° C. for 10 to 120 minutes to prepare a catalytic system;
   (3) a polymerization process of infusing the catalytic system, so obtained from said (2) process, into said (1) process and of reacting the mixture at the temperature of −70to −20° C. for 30 to 360 minutes;
   (4) a process of infusing a previously cooled methanol solution into the resulting solution of said (3) process at the temperature of −70 to −20° C. and of terminating the reaction; and,
   (5) a process of washing the polymer, so precipitated, with methanol, followed by filtration and drying to obtain the final polymer.

3. The process for producing polyisobutene according to claim 1, wherein it comprises:

(1) a process of adding said transition metal compound (I) to said benzene derivative compound (II), followed by the addition of the catalytic system, so activated by said methylaluminoxane (III), to isobutene dissolved in a polymerization solvent for polymerization at the temperature of −70 to 20° C. for 30 to 360 minutes;

(2) a process of infusing a previously cooled methanol solution into the resulting solution of said process at the temperature of −70~−20° C. and of terminating the reaction; and, (3) a process of washing the polymer, so precipitated, with methanol, followed by filtration and drying to obtain the final polymer.

4. The process for producing polyisobutene according to claim 1, wherein the mole ratio of the added transition metal compound (I) to said isobutene monomer is from 1/5000 to 1/1,000; the mole ratio of the benzene derivative compound (II) to said transition metal compound is from 0.5 to 2; and, the mole ratio of added methylaluminoxane (III) to said transition metal compound (I) is from 1 to 10.

5. The process for producing polyisobutene according to claim 1, wherein one or more of said non-halogen polymerization solvents are selected from the group consisting of toluene, cyclohexane and hexane.

6. The process for producing polyisobutene according to claim 2, wherein the mole ratio of the added transition metal compound (I) to said isobutene monomer is from 1/5000 to 1/1,000; the mole ratio of the benzene derivative compound (II) to said transition metal compound is from 0.5 to 2; and, the mole ratio of added methylaluminoxane (III) to said transition metal compound (I) is from 1 to 10.

7. The process for producing polyisobutene according to claim 3, wherein the mole ratio of the added transition metal compound (I) to said isobutene monomer is from 1/5,000 to 1/1,000; the mole ratio of the benzene derivative compound (II) to said transition metal compound is from 0.5 to 2; and, the mole ratio of added methylaluminoxane (III) to said transition metal compound (I) is from 1 to 10.

8. The process for producing polyisobutene according to claim 2, wherein one or more of said non-halogenated polymerization solvents are selected from the group consisting of toluene, cyclohexane and hexane.

9. The process for producing polyisobutene according to claim 3, wherein one or more of said non-halogenated polymerization solvents are selected from the group consisting of toluene, cyclohexane and hexane.

* * * * *